(12) United States Patent
Caponera et al.

(10) Patent No.: US 10,670,068 B2
(45) Date of Patent: Jun. 2, 2020

(54) FRANGIBLE FASTENER SYSTEM

(71) Applicant: Apical Industries, Inc., Oceanside, CA (US)

(72) Inventors: Nicholas Philip Caponera, Valatie, NY (US); Sven Emil Andersson, Oceanside, CA (US)

(73) Assignee: Apical Industries, Inc., Vista, CA (US)

( * ) Notice: Subject to any disclaimer, the term of this patent is extended or adjusted under 35 U.S.C. 154(b) by 261 days.

(21) Appl. No.: 15/581,841

(22) Filed: Apr. 28, 2017

(65) Prior Publication Data

US 2018/0313388 A1    Nov. 1, 2018

(51) Int. Cl.
  *F16B 31/02*    (2006.01)
  *F16B 35/06*    (2006.01)

(52) U.S. Cl.
  CPC ........... *F16B 31/021* (2013.01); *F16B 35/06* (2013.01)

(58) Field of Classification Search
  CPC ................. F16B 31/021; F16B 35/06
  See application file for complete search history.

(56) References Cited

U.S. PATENT DOCUMENTS

| | | | |
|---|---|---|---|
| 1,380,395 A | 6/1921 | Korach | |
| 1,677,269 A | 12/1925 | Burghart | |
| 2,083,054 A | 6/1937 | Cline | |
| 3,027,796 A | 5/1957 | Shewmon | |
| 3,117,486 A | 1/1964 | Matthews | |
| 3,224,316 A | 12/1965 | Grikscheti et al. | |
| 3,444,775 A | 5/1969 | Hills | |
| 3,498,174 A | 3/1970 | Schuster et al. | |
| 3,512,447 A | 5/1970 | Vaughn | |
| 3,865,007 A | 2/1975 | Stanback | |
| 3,965,792 A | 6/1976 | King, Jr. | |
| 5,110,158 A | 5/1992 | Sabo et al. | |
| 5,499,892 A | 3/1996 | Reed | |
| 5,713,705 A | 2/1998 | Grunbichler | |
| 6,095,733 A | 8/2000 | Busby et al. | |
| 6,109,848 A | 8/2000 | Werner | |

(Continued)

OTHER PUBLICATIONS

International Search Report issued in corresponding International Application No. PCT/US18/29957 dated Jul. 20, 2018.

(Continued)

*Primary Examiner* — John C Hong
(74) *Attorney, Agent, or Firm* — Pillsbury, Winthrop, Shaw, Pittman, LLP; Peter K. Hahn; Jeffrey T. Sheriff

(57) ABSTRACT

A frangible fastener system configured to secure a second retained member to a first retained member until the frangible fastener system receives a breaking force is described. The frangible fastener system comprises a first fastener and a second fastener. The first fastener comprises a flange configured to cause retention of the first retained member toward a base member. The first fastener is configured to engage the base member and to receive the second fastener along a first axis of the frangible faster system. The second fastener comprises a frangible portion configured to separate responsive to receiving the breaking force, and a head portion connected to the frangible portion. The head portion is configured to cause retention of the second retained member toward the first retained member until the frangible portion separates responsive to receiving the breaking force.

14 Claims, 6 Drawing Sheets

(56) References Cited

U.S. PATENT DOCUMENTS

| | | |
|---|---|---|
| 6,176,659 B1 | 1/2001 | Hardt et al. |
| 6,308,927 B1 | 10/2001 | Leahy |
| 6,699,062 B1 | 3/2004 | Barnett et al. |
| 6,908,275 B2 | 6/2005 | Nelson et al. |
| 7,275,903 B2 | 10/2007 | Schultz |
| 8,696,274 B2 | 4/2014 | Kim et al. |
| 8,875,368 B2 | 11/2014 | O'Sullivan |
| 10,006,480 B2 * | 6/2018 | Bier ................... F16B 31/021 |
| 2003/0084621 A1 | 5/2003 | Leahy |
| 2003/0198528 A1 | 10/2003 | Onishi et al. |
| 2007/0092352 A1 | 4/2007 | Nilsen |
| 2009/0194638 A1 | 8/2009 | Dennis |
| 2009/0196708 A1 | 8/2009 | Stauch et al. |
| 2014/0241826 A1 | 8/2014 | Caponera et al. |
| 2016/0305464 A1 | 10/2016 | Balderrama et al. |

OTHER PUBLICATIONS

Written Opinion of International Searching Authority issued in corresponding International Application No. PCT/US18/29957 dated Jul. 20, 2018.
International Preliminary Report on Patentability issued in corresponding International Application No. PCT/US18/29957 dated Nov. 7, 2019.

* cited by examiner

FRANGIBLE FASTENER SYSTEM

FIELD OF THE DISCLOSURE

This disclosure relates to a frangible fastener system configured to secure a second retained member to a first retained member until the frangible fastener system receives a breaking force.

BACKGROUND

Frangible fasteners are known. Frangible fasteners break when subjected to forces above threshold levels. Frangible fasteners are commonly used to couple two or more structural components that are configured to separate when subjected to forces above the threshold levels. For example, an emergency compartment door may be closed and secured by frangible fasteners. These frangible fasteners are designed to break when the pressure exerted against the door reaches a certain level. Once the fasteners break the compartment door can open. Typical frangible fasteners may be limited by an amount of torque that may be applied to the fastener during installation so that the fastener does not break during installation.

SUMMARY

One aspect of the disclosure relates to a frangible fastener system comprising a first fastener, a second fastener, and/or other components. The first fastener may be configured to secure a first retained member to a base member and/or perform other functions. The second fastener may be configured to couple with the first fastener and secure a second retained member to the first retained member and/or the base member until receiving a breaking force. Responsive to the fastener system receiving a breaking force, a first end of the second fastener may separate from the first fastener, and the second retained member may separate from the first retained member.

The first fastener comprises a head portion, a body, a threaded portion, and/or other components. The head portion may comprise a head threaded portion, a flange, and/or other components. The head threaded portion may be located at a first end of the first fastener and configured to receive an end of the second fastener. The flange may be configured to abut the first retained member and/or other devices. The flange may be located between the first retained member and the second retained member when the first fastener secures the first retained member to the base member and the second fastener secures the second retained member to the first retained member. The body may be located adjacent to the head portion toward a second end of the first fastener. The threaded portion of the first fastener may be located adjacent to the body at the second end of the first fastener. The threaded portion may be configured to pass through an orifice in the first retained member and engage corresponding threads in the base member such that the flange may cause retention of the first retained member toward the base member.

The second fastener comprises a frangible portion, a tool engagement portion, a head portion, a threaded portion, and/or other components. The frangible portion may be configured to separate responsive to receiving the breaking force and/or for other reasons. The tool engagement portion may be configured to engage a tightening tool and/or other tools. The tool engagement portion may be located adjacent to the frangible portion toward an end of the second fastener that couples with the first fastener. In some implementations, the tool engagement portion and/or the end of the second fastener may remain coupled with the first fastener after the opposite end of the second fastener separates from the first fastener. The head portion may be located at the opposite end of the second fastener. The head portion may be configured to engage the second retained member as the second fastener is tightened via the tool engagement portion. The threaded portion of the second fastener may be located adjacent to the tool engagement portion at or near the end of the second fastener that couples with the first fastener. This threaded portion may be configured to engage the corresponding threaded portion of the first fastener and cause retention of the second retained member toward the first retained member to secure the second retained member to the first retained member. The threaded portion of the second fastener may be configured to cause retention of the second retained member toward the first retained member to secure the second retained member to the first retained member until the frangible portion separates responsive to receiving the breaking force.

Another aspect of the disclosure relates to a method for securing the second retained member to the first retained member until receiving a breaking force. The method may comprise causing retention of the first retained member toward a base member with the flange of the first fastener, the first fastener configured to engage the base member to cause the retention with the flange; receiving the second fastener with the first fastener along a first axis of the first fastener, the second fastener comprising the frangible portion configured to separate responsive to receiving the breaking force; and causing retention of the second retained member toward the first retained member with the second fastener until the frangible portion of the second fastener separates responsive to receiving the breaking force.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

In the following paragraphs, implementations of the present disclosure will be described in detail by way of example with reference to the accompanying drawings, which are not necessarily drawn to scale, and the illustrated components are not necessarily drawn proportionately to one another. Throughout this description, the implementations and examples shown should be considered as exemplars, rather than as limitations on the present disclosure. As used herein, the "present disclosure" refers to any one of the embodiments of the disclosure described herein, and any equivalents. Furthermore, reference to various aspects of the disclosure throughout this document does not mean that all claimed embodiments or methods must include the referenced aspects.

Figure 1:
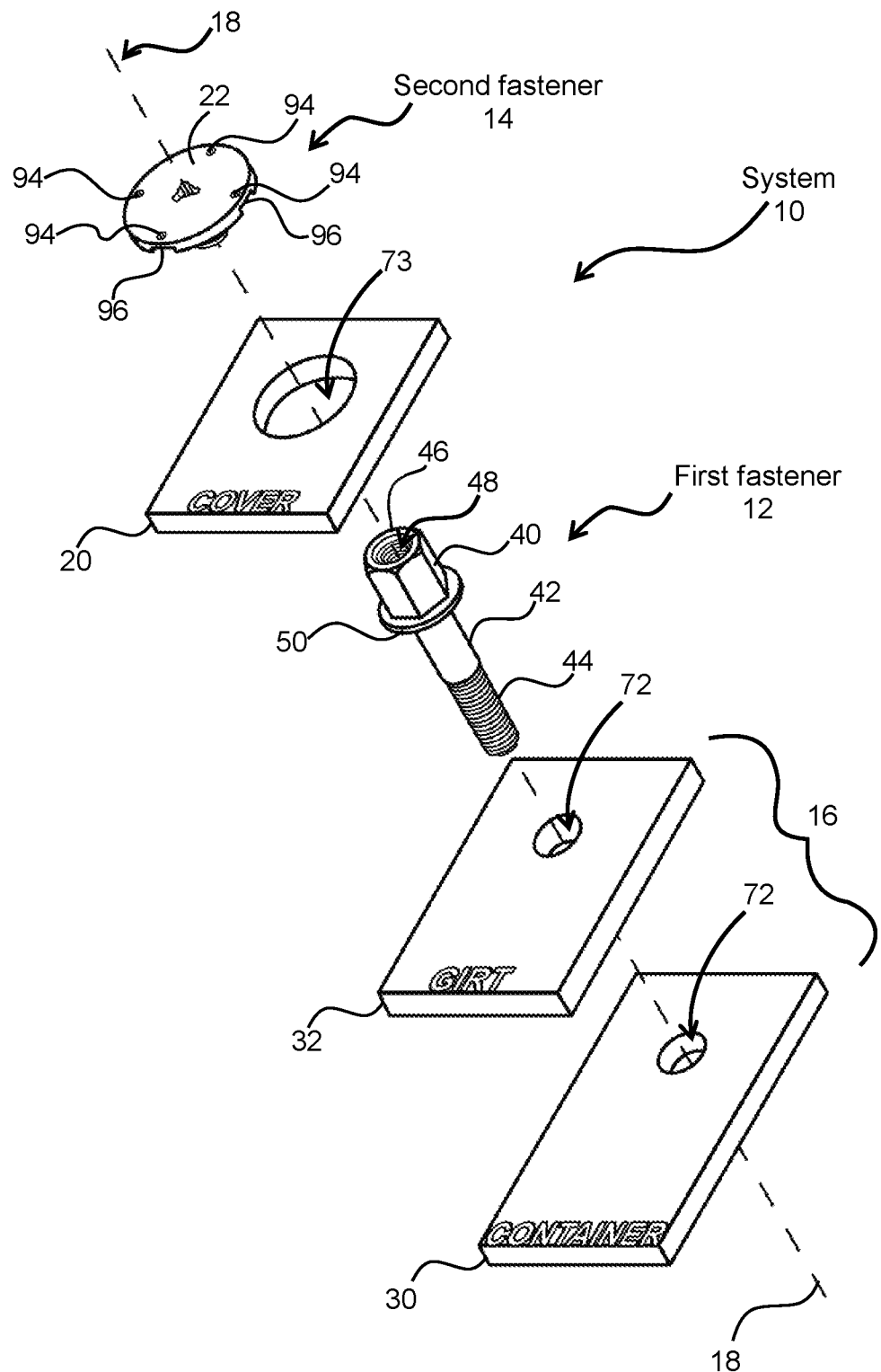
FIG. 1 illustrates a frangible fastener system configured to secure a second retained member to a first retained member until the frangible fastener system receives a breaking force.

FIG. 1 illustrates a frangible fastener system 10 comprising a first fastener 12, a second fastener 14, and/or other components. First fastener 12 may be configured to secure a first retained member 16 to a base member (not shown in FIG. 1) and/or perform other functions. Second fastener 14 may be configured to couple with first fastener 12 along a first axis 18 of fastener system 10 and secure a second retained member 20 to first retained member 16 and/or the base member until receiving a breaking force. Responsive to fastener system 10 receiving a breaking force, a first end 22 of second fastener 14 separates from first fastener 12, and second retained member 20 separates from first retained member 16.

Securing first retained member 16 and/or second retained member 20 may include retaining first retained member 16 and second retained member 20 in specific positions relative to each other, the base member, and or other components of system 10; compressing first retained member 16 and/or second retained member 20 against each other, the base member, and/or other components of system 10; and/or other securing. In some implementations, securing may include allowing small movements (e.g., small positional shifts because a component is not rigidly tightened down) by first retained member 16, second retained member 20, and/or other components secured by system 10.

By way of a non-limiting example, system 10 may secure the exterior cover of inflatable safety equipment in a fixed position on an aircraft. In the event the safety equipment must be deployed, second fastener 14 may separate responsive to the breaking force of the inflating safety equipment within the cover. In some implementations, system 10 may be used as an alternative to break away wire and/or in other applications. In some implementations, the base may be and/or include, for example, an aircraft fuselage, helicopter landing skids, and/or other base members. In this example, first retained member 16 may comprise a container 30, a girt 32, and/or other components. Container 30 and/or girt 32 may be coupled to the aircraft fuselage, for example. Container 30 may be configured to contain the inflatable safety devices and/or other equipment. In some implementations, second retained member 20 may comprise a cover configured to cover container 30 and/or girt 32 and secure the inflatable safety devices and/or other equipment in container 30 (e.g., until second fastener 14 separates).

This description of securing inflatable safety devices to an aircraft should not be considered limiting. It should be noted that the size, scale, and/or materials of system 10 may vary depending on the application. As such, the dimensions of the features described herein are not intended to be limiting. In some implementations, the dimensions may be increased and/or decreased from what is described herein such that second fastener 14 separates responsive to specifically targeted breaking forces. One of ordinary skill in the art will understand, for example, that the dimensions described herein may be increased (e.g., in an application requiring a larger version of system 10) and/or decreased (e.g., in an application requiring a smaller version of system 10) by factors of 2, 3, or more from what is described to achieve the targeted breaking forces.

Figure 2:
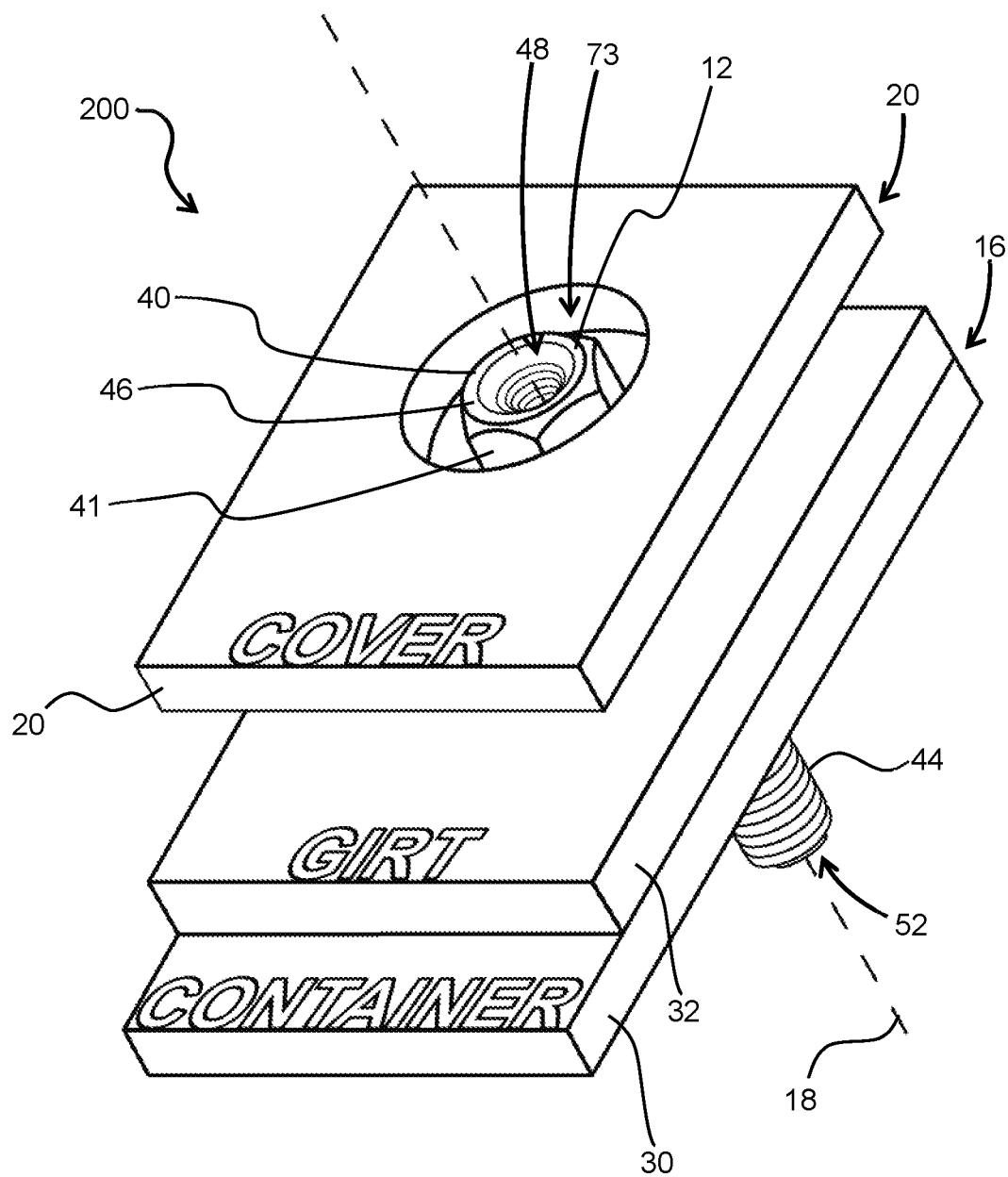
FIG. 2 illustrates a view of the system securing the first retained member.
Figure 3:
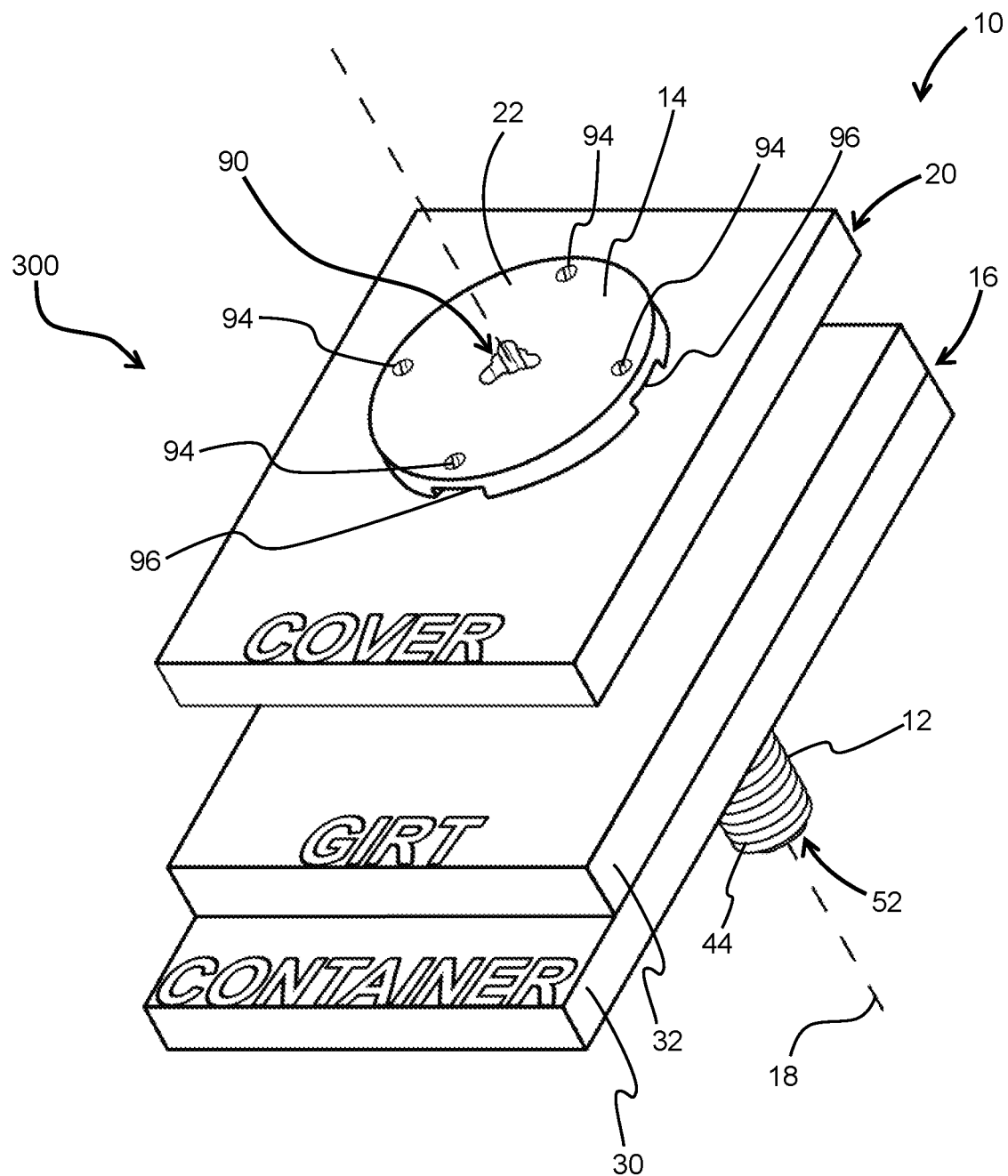
FIG. 3 illustrates a view of the system securing the first retained member and the second retained member.

FIG. 2 and FIG. 3 illustrate views 200 and 300 of system 10 securing first retained member 16 and second retained member 20. View 200 in FIG. 2 illustrates first fastener 12 securing first retained member 16 (e.g., container 30 and girt 32). FIG. 2 illustrates second retained member 20 (e.g., the cover) in position to be secured by second fastener 14 (not shown in FIG. 2) and/or perform other functions. View 300 in FIG. 3 illustrates first fastener 12 securing first retained member 16 (e.g., container 30 and girt 32) and second fastener 14 securing second retained member 20 (e.g., the cover).

Figure 4:
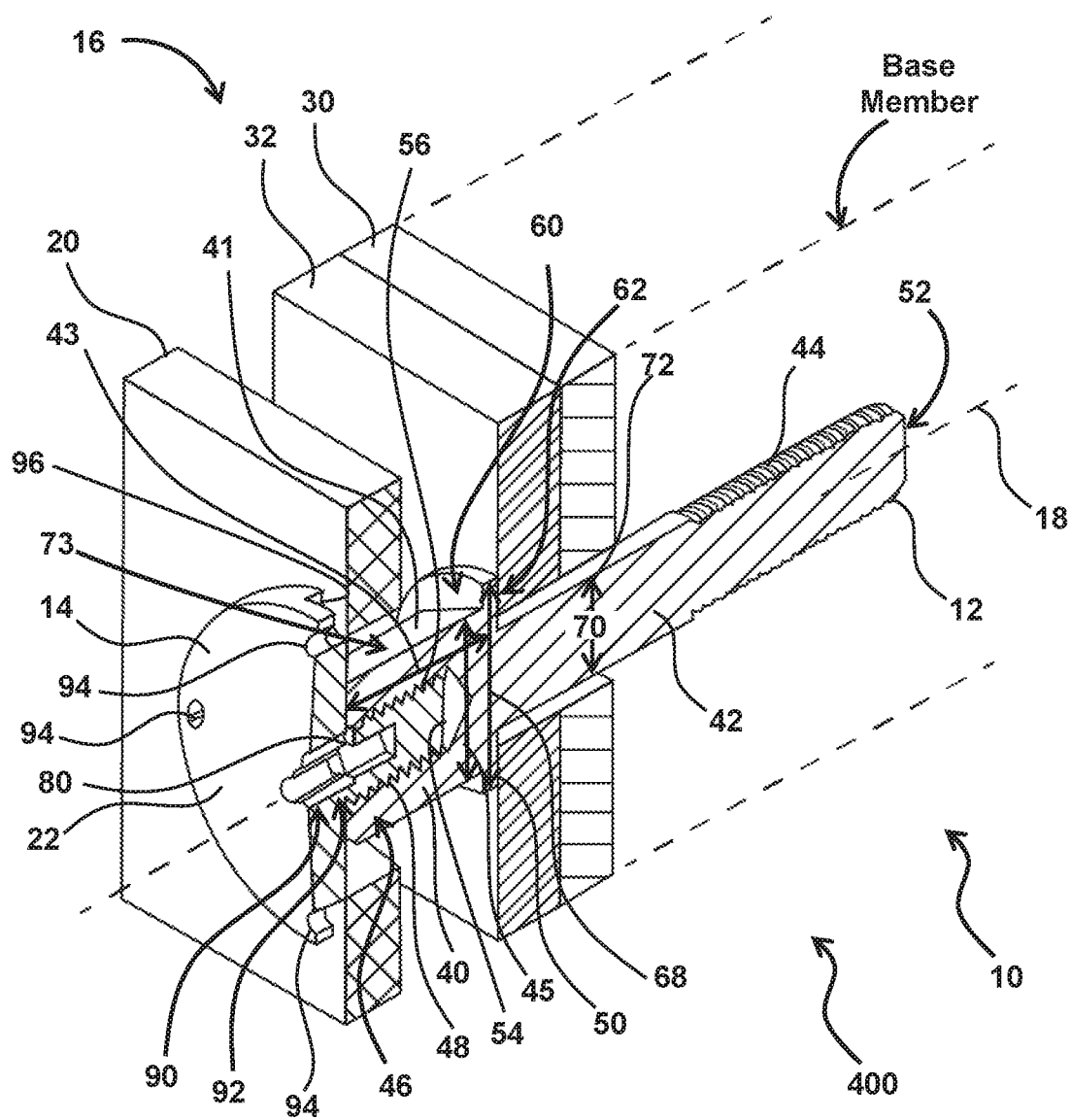
FIG. 4 illustrates a cross-sectional perspective view of the system.
Figure 5:
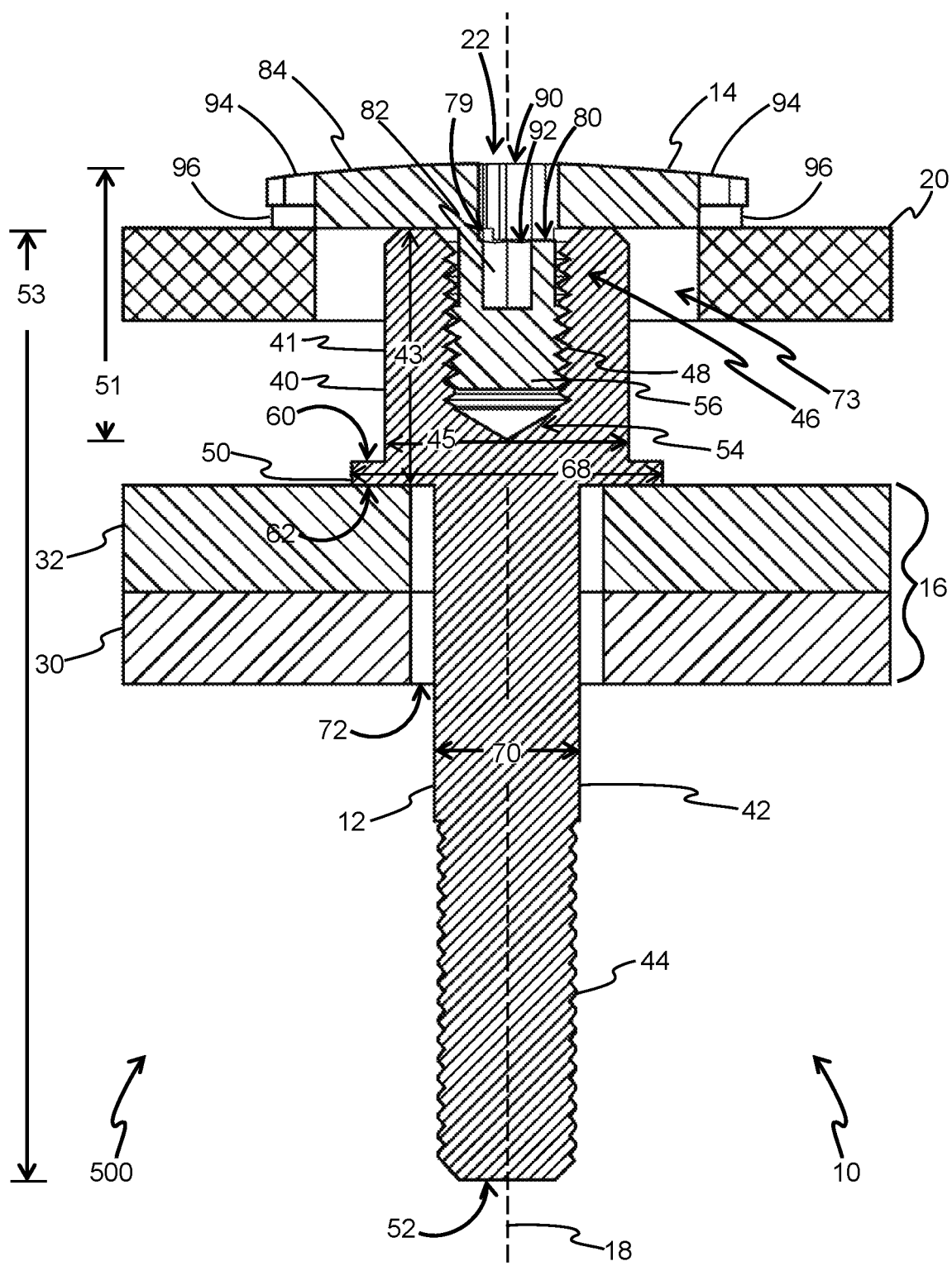
FIG. 5 illustrates an enlarged cross-sectional view of the system.

FIG. 4 and FIG. 5 illustrate cross-sectional views 400 and 500 of system 10 securing first retained member 16 and second retained member 20. FIG. 4 is a cross-sectional perspective view of system 10 and FIG. 5 is an enlarged cross-sectional view of system 10. Both FIG. 4 and FIG. 5 illustrate cross-sectional views of first fastener 12, second fastener 14, first retained member 16, second retained member 20, and/or other components. As shown in FIG. 4 and FIG. 5, first fastener 12 comprises a head portion 40, a body 42, a threaded portion 44, and/or other components.

Head portion 40 may be located at a first end 46 of first fastener 12. Head portion 40 may comprise a threaded portion 48, a flange 50, and/or other components. Threaded portion 48 may be located at first end 46 of first fastener 12. Threaded portion 48 may extend along first axis 18 toward a second end 52 of first fastener 12. Threaded portion 48 may be configured to receive an end 54 of second fastener 14. Threaded portion 48 may form an internal recess in head portion 40 such that first fastener 12 may receive second fastener 14 via corresponding threads 48, 56 on first fastener 12 and second fastener 14. In some implementations, head portion 40 may have a hexagonal cross-sectional shape and/or other cross-sectional shapes. In some implementations, an outer surface 41 of head portion 40 may be shaped like a nut and configured to be engaged by fingers of a user, a wrench, and/or other tools.

Flange 50 may be configured to abut first retained member 16 and/or other devices. Flange 50 may be located between first retained member 16 and second retained member 20 when first fastener 12 secures first retained member 16 to the base member and second fastener 14 secures second retained member 20 to first retained member 16. Flange 50 may have a first side 60 toward end 46 of first fastener 12 and a second side 62 toward end 52 of first fastener 12. Second side 62 of flange 50 may be configured to abut first retained member 16 and/or other devices. Flange 50 may have a cylindrical cross-section and/or other cross-sectional shapes.

Body 42 may be located adjacent to head portion 40 toward second end 52 of first fastener 12 along first axis 18 relative to flange 50. Body 42 may have a cylindrical cross-section and/or other cross-sectional shapes. Threaded portion 44 may be located adjacent to body 42 at second end 52 of first fastener 12 along first axis 18. Threaded portion 44 may be configured to pass through an orifice 72 in first retained member 16 and engage corresponding threads in the base member (not shown in FIG. 4 or FIG. 5) along first axis 18 such that flange 50 may cause retention of first retained member 16 toward the base member. In some implementations, causing retention may include causing compression of first retained member 16 against the base member, holding first retained member in a specific position relative to the base member without compressing first retained member 16, and/or other retention.

In some implementations, threaded portion 44, body 42, head portion 40, and/or other components of first fastener 12 may be configured such that a length 53 of first fastener 12 along first axis 18 is longer than a length 51 of second faster 14 along first axis 18 (shown in FIG. 5).

Second fastener 14 comprises a frangible portion 80, a tool engagement portion 82, a head portion 84, threaded portion 56, and/or other components. In some implementations, second fastener 14 may engage first fastener 12 via an orifice 73 in second retained member 20. In some implementations, second fastener 14 is similar to and/or the same as the fastener described in U.S. Pat. No. 8,911,189 issued on Dec. 16, 2014 and entitled "Frangible Fastener", which is hereby incorporated by reference in its entirety.

Frangible portion 80 may be located toward end 22 of second fastener 14. Frangible portion 80 may be configured to separate responsive to receiving the breaking force and/or for other reasons. In some implementations, frangible portion 80 may comprise a plurality of through wall cuts 79 (FIG. 5) in frangible portion 80. Frangible portion 80 may be configured to separate at or near through wall cuts 79 responsive to receiving the breaking force. In some implementations, through wall cuts 79 may be radial through wall cuts on a plane substantially perpendicular to first axis 18. In some implementations, frangible portion 80 may be configured such that the breaking force is between about 5 pounds and about 400 pounds. In some implementations, frangible portion 80 may be configured such that the breaking force is between about 5 pounds and about 100 pounds. In some implementations, frangible portion 80 may be configured such that the breaking force is between about 5 pounds and about 25 pounds. In some implementations, frangible portion 80 may be configured to separate responsive to one or more of a tensile force, a shear force, and/or other forces. In some implementations, frangible portion 80 may be configured to separate responsive to a plurality of forces acting at substantially the same time. In some implementations, frangible portion 80 may be configured such that the breaking force meets technical standard order (TSO) performance standards for a given application (e.g., a 25 pound force limitation typically required for the activation of mechanical emergency systems).

In some implementations, frangible portion 80 may be configured such that the breaking force is proportional to a magnitude of through wall cuts 79. The magnitude of through wall cuts 79 may comprise one or more of a quantity of through wall cuts 79, a cross sectional area of through wall cuts 79, a shape (e.g., rounded corners and/or sharp corners) of through wall cuts 79, and/or other properties of through wall cuts 79. In some implementations, frangible portion 80 may be configured such that the breaking force is proportional to a wall thickness (not shown in FIG. 4 or FIG. 5) of frangible portion 80. In some implementations, frangible portion 80 may be configured such that the breaking force is proportional to the inherent material properties of frangible portion 80. The inherent material properties may include one or more of tensile strength, shear strength, and/or other properties of the material used to form second fastener 14.

Tool engagement portion 82 may be configured to engage a tightening tool and/or other tools. Tool engagement portion 82 may be located adjacent to frangible portion 80 toward end 54 of second fastener 14 along first axis 18. In some implementations, tool engagement portion 82 and/or end 54 of the second fastener may remain coupled with first fastener 12 after end 22 of second fastener 14 separates from first fastener 12. The location of tool engagement portion 82 may minimize and/or eliminate torsional loading of frangible portion 80 during tightening with the tightening tool. In some implementations, tool engagement portion 82 may be configured such that an axial load (e.g., tension) may be transferred to and/or through frangible portion 80 responsive to head portion 84 engaging second retained member 20 as second fastener 14 is tightened.

Head portion 84 may be located at end 22 of second fastener 14. Frangible portion 80 may be located adjacent to head portion 84 toward end 54 of second fastener 14 along first axis 80. Head portion 84 may form a channel 90 configured to receive the tightening tool and/or other devices. Frangible portion 80 may be configured to conduct the tightening tool from channel 90 in head portion 84 to tool engagement portion 82 through a conduit 92 formed by frangible portion 80 to facilitate tightening threaded portion 56 in threaded portion 48. As described above, head portion 84 may be configured to engage second retained member 20 as shown in FIG. 4 and FIG. 5 as second fastener 14 is tightened via tool engagement portion 82 and/or threaded portion 56. Engaging second retained member 20 with head portion 84 may include contacting and/or compressing, for example, a side of head portion 84 that faces second retained member 20 against and/or toward second retained member 20.

In some implementations, head portion 84 may form a plurality of peripheral holes 94. In some implementations, head portion 84 may form depth cuts 96 that correspond to peripheral holes 94. In the examples shown in FIG. 1 and FIG. 3-5, there are four peripheral holes 94 and four corresponding depth cuts 96. Peripheral holes 94 and/or depth cuts 96 may be configured to receive safety wiring to secure head portion 84 to second retained member 20 and/or other external components, and/or be used for other purposes. The quantity and approximate dimensions of peripheral holes 94 and/or depth cuts 96 shown in the figures are not intended to be limiting. Peripheral holes 94 and/or depth cuts 96 may have any dimension in any quantity that allows them to function as described in the present disclosure.

Threaded portion 56 may be located adjacent to tool engagement portion 82 at or near end 54 of second fastener 14 along first axis 18. As described above, threaded portion 56 may be configured to engage threaded portion 48 of first fastener 12 and cause retention of second retained member 20 toward first retained member 16 to secure second retained member 20 to first retained member 16. Threaded portion 56 may be configured to cause retention of second retained member 20 toward first retained member 16 to secure second retained member 20 to first retained member 16 until frangible portion 80 separates responsive to receiving the breaking force.

Figure 6:
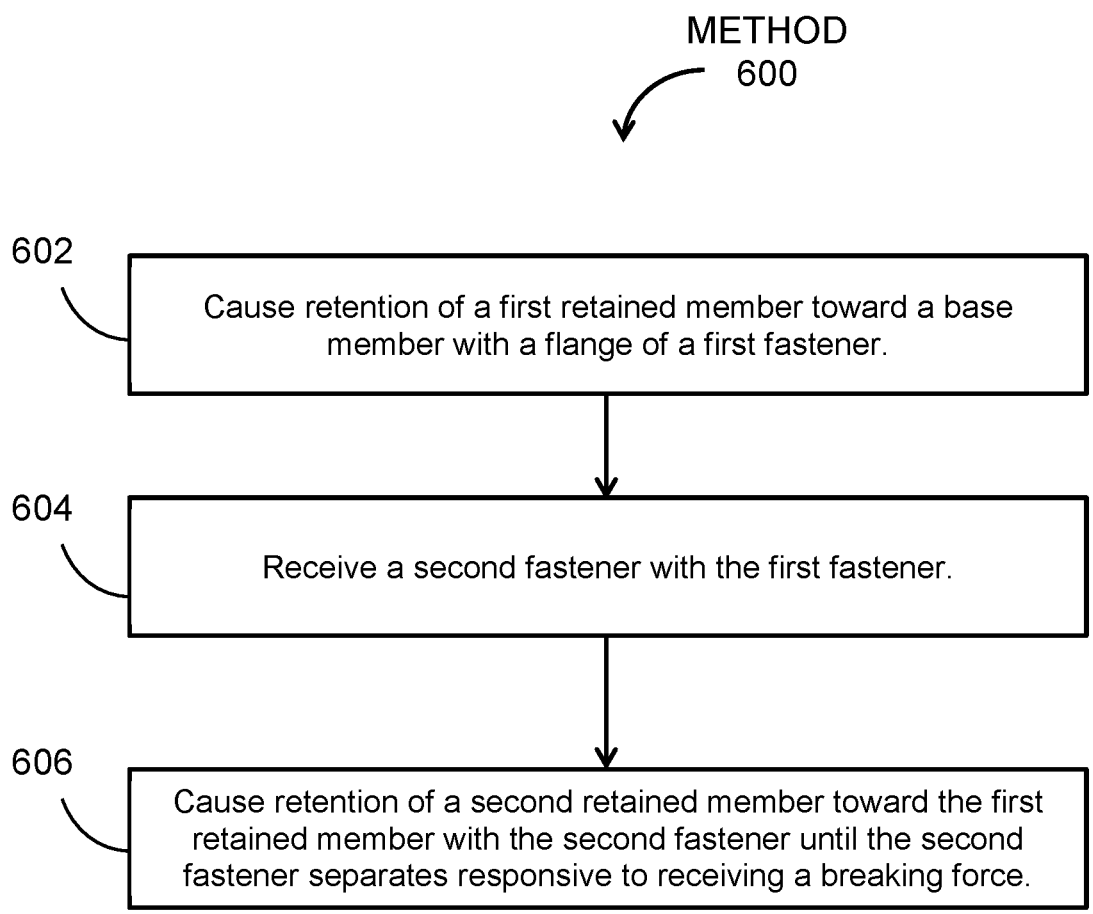
FIG. 6 illustrates a method for securing a second retained member to a first retained member until receiving a breaking force.

FIG. 6 illustrates a method 600 for securing a second retained member to a first retained member with a frangible fastener system until the system receives a breaking force. The frangible fastener system comprises a first fastener, a second fastener, and/or other components. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

Operation 602 may include causing retention of a first retained member toward a base member with a flange of the first fastener. The first fastener may be configured to engage the base member to cause the retention with the flange. In some implementations, the base member may be and/or be part of an aircraft fuselage and/or other base members. The first retained member may be and/or include a container and/or a girt. In some implementations, operation 602 may be performed by a first fastener similar to and/or the same as first fastener 12 shown in FIG. 1 and described herein.

At an operation 604, the first fastener may receive the second fastener. The second fastener may be received with the first fastener along a first axis of the first fastener. In some implementations, receiving the second fastener with the first fastener comprises coupling the second fastener to the first fastener via corresponding threads on the first fastener and the second fastener. In some implementations, operation 604 may be performed by a first fastener similar to and/or the same as first fastener 12 shown in FIG. 1 and described herein.

Operation 606 may include causing retention of a second retained member toward the first retained member with the second fastener until the second fastener separates responsive to receiving a breaking force. The second retained member may be and/or include a cover and/or other components. The second fastener may comprise a frangible portion configured to separate responsive to receiving the breaking force. In some implementations, operation 606 may be performed by a second fastener similar to and/or the same as second fastener 14 shown in FIG. 1 and described herein.

In some implementations, method 600 further comprises engaging a tightening tool with a tool engagement portion of the second fastener to facilitate the receiving of the second fastener by the first fastener. The tool engagement portion may be located adjacent to the frangible portion toward an end of the second fastener located toward the first fastener along the first axis which remains coupled with the first fastener after the frangible portion of the second fastener separates. In some implementations, method 600 further comprises removing the tool engagement portion and the end of the second fastener located toward the first fastener from the first fastener via engagement with the tightening tool after separation of the frangible portion of the second fastener.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A frangible fastener system comprising a first fastener configured to secure a first retained member to a base member, and a second fastener configured to couple with the first fastener along a first axis of the fastener system and secure a second retained member to the first retained member until receiving a breaking force such that a first end of the second fastener separates from the first fastener, and the second retained member separates from the first retained member responsive to the fastener system receiving the breaking force, wherein the second fastener comprises:
   a frangible portion located toward the first end of the second fastener configured to separate responsive to receiving the breaking force; and
   a tool engagement portion configured to engage a tightening tool, the tool engagement portion located adjacent to the frangible portion toward a second end of the second fastener along the first axis, the tool engagement portion and the second end of the second fastener remaining coupled with the first fastener after the first end of the second fastener separates from the first fastener;
   wherein the first fastener comprises:
   a first head portion located at a first end of the first fastener, the first head portion comprising:
      a first threaded portion located at the first end of the first fastener and extending along the first axis toward a second end of the first fastener, the first threaded portion configured to receive the second end of the second fastener; and
      a flange configured to abut the first retained member;
   a body located adjacent to the first head portion toward the second end of the first fastener along the first axis; and
   a second threaded portion located adjacent to the body at the second end of the first fastener along the first axis configured to pass through an orifice in the first retained member and engage corresponding threads in the base member along the first axis such that the flange causes retention of the first retained member toward the base member.

2. The system of claim 1, wherein the flange is located between the first retained member and the second retained member when the first fastener secures the first retained member to the base member and the second fastener secures the second retained member to the first retained member.

3. The system of claim 2, wherein the flange has a first side toward the first end of the first fastener and a second side toward the second end of the first fastener, the second side of the flange configured to abut the first retained member.

4. The system of claim 1, wherein the first threaded portion forms an internal recess in the first head portion.

5. The system of claim 1, wherein the second fastener further comprises:
   a second head portion located at the first end of the second fastener; wherein the frangible portion is located adjacent to the second head portion toward the second end of the second fastener along the first axis; and
   a third threaded portion located adjacent to the tool engagement portion at the second end of the second fastener along the first axis configured to engage the first threaded portion of the first fastener and cause retention of the second retained member toward the first retained member to secure the second retained member to the first retained member.

6. The system of claim 5, wherein the third threaded portion is configured to cause retention of the second retained member toward the first retained member to secure the second retained member to the first retained member until the frangible portion separates responsive to receiving the breaking force.

7. The system of claim 6, wherein the second head portion forms a channel configured to receive the tightening tool, and wherein the frangible portion is configured to conduct the tightening tool from the channel in the second head portion to the to the tool engagement portion through a conduit formed by the frangible portion to facilitate tightening the third threaded portion in the first threaded portion.

8. The system of claim 7, wherein the second fastener is configured such that the tool engagement portion and the third threaded portion are removable from the first fastener via engagement with the tightening tool before and after separation of the first end of the second fastener from the first fastener.

9. The system of claim 1, wherein a length of the first fastener along the first axis is longer than a length of the second faster along the first axis.

10. A frangible fastener system configured to secure a second retained member to a first retained member until the frangible fastener system receives a breaking force, the frangible fastener system comprising a first fastener and a second fastener, wherein
the first fastener comprises a flange configured to cause retention of the first retained member toward a base member and is configured to engage the base member and to receive the second fastener along a first axis of the frangible faster system; and wherein
the second fastener comprises:
a frangible portion configured to separate responsive to receiving the breaking force; and
a head portion connected to the frangible portion and configured to cause retention of the second retained member toward the first retained member until the frangible portion separates responsive to receiving the breaking force.

11. The system of claim 10, wherein the second fastener further comprises a tool engagement portion configured to engage a tightening tool, the tool engagement portion located adjacent to the frangible portion toward an end of the second fastener located toward the first fastener along the first axis which remains coupled with the first fastener after the frangible portion of the second fastener separates.

12. The system of claim 11, wherein the second fastener is configured such that the tool engagement portion and the end of the second fastener located toward the first fastener are removable from the first fastener via engagement with the tightening tool before and after separation of the head portion of the second fastener from the first fastener.

13. The system of claim 10, wherein the first fastener receives the second fastener via corresponding threads on the first fastener and the second fastener.

14. The system of claim 10, wherein the first retained member comprises a container and a girt, and the second retained member comprises a cover.

* * * * *